United States Patent [19]

Dorner et al.

[11] 3,898,126
[45] Aug. 5, 1975

[54] REACTOR PRESSURE TANK

[75] Inventors: Heinrich Dorner; Manfred Scholz; Axel Jungmann, all of Erlangen, Germany

[73] Assignee: Siemens Aktiengesellschaft, Munich, Germany

[22] Filed: Dec. 18, 1972

[21] Appl. No.: 315,932

[30] Foreign Application Priority Data
Dec. 23, 1971 Germany............................ 2164128
Aug. 7, 1972 Germany............................ 2238886

[52] U.S. Cl................ 176/87; 220/55 G; 220/55 W
[51] Int. Cl............................................. G21c 13/02
[58] Field of Search .......... 176/87; 220/55 G, 55 H, 220/55 W, 18

[56]  References Cited
UNITED STATES PATENTS
3,389,516  6/1968  Ziegler................................. 176/87
3,416,701  12/1968  Kramer et al..................... 220/55 G
3,549,493  12/1970  Germer................................. 176/87
3,583,429  6/1971  Desmarchais........................ 176/87
3,633,784  1/1972  Taft et al............................. 176/87
3,694,145  9/1972  Stevens............................ 220/55 W FOREIGN PATENTS OR APPLICATIONS
6,617,536  6/1967  Netherlands...................... 220/55 G
1,048,758  8/1953  France............................. 220/55 G Primary Examiner—Benjamin R. Padgett
Assistant Examiner—Roger S. Gaither
Attorney, Agent, or Firm—Kenyon & Kenyon Reilly Carr & Chapin

[57]  ABSTRACT

In a reactor pressure tank for a nuclear reactor, self-locking hooks engage a steel ring disposed over the removable cover of the steel vessel. The hooks exert force upon the cover to maintain the cover in a closed position during operation of the reactor pressure tank. The force upon the removal cover is partly the result of the increasing temperature and thermal expansion of the steel vessel during operation. The steel vessel is surrounded by a reinforced-concrete tank.

9 Claims, 3 Drawing Figures

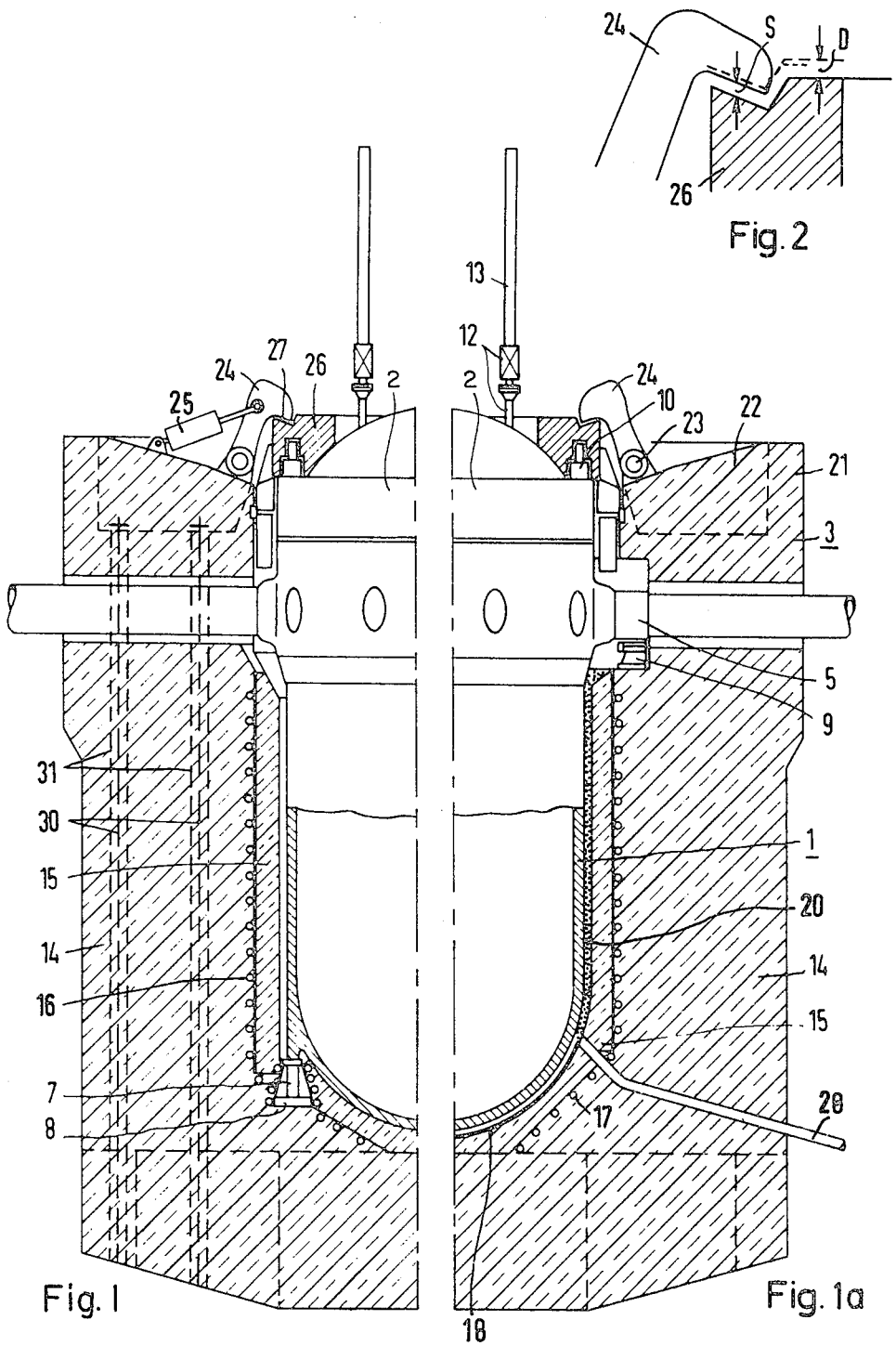

REACTOR PRESSURE TANK

BACKGROUND OF THE INVENTION

1. Field of the Invention

This invention relates to the field of nuclear reactors and more particularly to a reactor pressure tank having a pressure-resistant steel vessel with a removable cover and a special closure mechanism having self-locking hooks.

2. Description of the Prior Art

In reactor pressure tanks for nuclear reactors, concrete enclosures or tanks have been used to surround the steel vessel for the purpose of providing a biological shield to intercept the radiation which emanates from the reactor vessel. In addition, there have been attempts to increase the safety of reactor pressure tanks by means of a reinforced-concrete tank which surrounds the steel tank and is open at the top. Intercept structures have been provided for these reinforced-concrete tanks for the purpose of closing the opening at the top of the steel vessel so that, in the event of a rupture of the steel vessel, fragments of the steel vessel propelled by the pressure forces of the reactor coolant may be intercepted before they acquire large kinetic energy. For such a structure, see German published Pat. application 1,934,748.

Although the known intercept structure is designed so that it can be detached, the effort required for removing and attaching it is unsatifactory.

SUMMARY OF THE INVENTION

The object of this invention is to provide a pressure-resistant reactor tank having a safety closure and intercept mechanism which is more accessible and convenient to use.

According to this invention for a pressure-resistant reactor tank, self-locking hooks engage a steel ring which has been placed over the removable cover of the steel vessel within a reinforced-concrete tank which surrounds the steel vessel. The hooks are self-locking because of the thermal expansion and elongation of the steel vessel in the longitudinal direction as the temperature increases from a cold condition to the operating temperature. The expansion of the steel tank is transmitted through the cover and the steel ring to the self-locking hooks and produces a clamping action of the cover over the steel vessel. The self-locking hooks are pivotally mounted on an annular steel beam so that they can be swung away hydraulically or electrically when desired.

The reinforced-concrete tank which surrounds the steel vessel not only provides a biological shield, but also acts as a structural element. The reinforced-concrete tank provides mechanical support for the pressure-resistant steel vessel in the event that special stresses occur due to escaping coolant.

The steel ring placed over the cover provides uniform distribution of the holding forces from the hooks over the cover, so that the cover need not have special supports. The steel ring is also provided with an inclined surface which is designed to engage the hooks. The self-locking feature of the hooks in conjunction with the steel ring makes it impossible for coolant pressure to ever push the cover and the steel ring past the hooks. Since the hooks need not be under additional external pressure, a small force provided either hydraulically or electrically is sufficient to move the hooks. This allows the cover to be locked or removed quickly by means of the steel ring.

The hooks are supported at pivot points which in turn are supported by an annular steel beam which is anchored in the upper edge of the reinforced-concrete tank. This annular steel beam allows the distribution of forces to be transmitted uniformly to the concrete.

A cooling system is provided within the reinforced-concrete tank. This cooling system is important in the event of a rupture of the steel vessel. Coolant within the reactor may escape and the parts of the reactor which are retained in the reinforced-concrete tank by means of the hooks may exert greater stress on the reinforced-concrete tank. A layer of insulating concrete is also provided around the steel vessel to reduce the thermal stresses on the reinforced-concrete tank which may be highly stressed in event of damage. The cooling system is preferably arranged between the insulating concrete and the reinforced-concrete.

The insulating concrete may be lined with sheet metal on the side facing the steel vessel. This design should not be confused with known pressure tanks which consist of reinforced concrete and include a lining as a sealing means. In this invention, the steel vessel itself is pressure-resistant. The sheet metal lining on the inside of the insulating concrete merely improves heat removal. A filling may also be provided between the concrete and the steel vessel. Such a filling may consist of steel balls or spheres of ceramic material or other spherical filler bodies.

The steel vessel may be braced against the reinforced-concrete tank by means of support beams in order to distribute any excessive stresses on the reinforced-concrete tank.

To improve the self-locking feature of the hooks, a small clearance may be provided between the hooks and the steel ring. This clearance should be smaller than the elongation which occurs in the steel vessel as the result of thermal expansion. The elongation in the longitudinal or axial direction is transmitted to the steel ring as the steel vessel is heated to operating temperature. This design reduces the danger of circular or circumferential fracture. If a circular fracture does occur, the cross section available for the escape of reactor coolant is, at least, limited. Having the clearance smaller than the elongation of the steel vessel results in compressive forces in the steel vessel which counteract the internal pressure and resulting stresses which occur as the steel vessel is heated up from a cold condition of approximately 20° C. to the operating condition of approximately 300° C. The clearance can be arranged so that the compression force of the steel vessel is approximately equal to the tensile stress exerted by internal pressure. For practical purposes, the steel vessel is then free of stress in the longitudinal direction, at least in the range in which it is kept under pressure by the reinforced-concrete tank and the hooks. In this way, the tensile stress caused by internal pressure is canceled by the compressive forces which are produced by the restricted thermal expansion against the pivoted hooks.

In another embodiment of this invention, the pivoted hooks are affixed to steel rods which are axially disposed in pipes within the reinforced-concrete tank. The thermal expansion of the steel vessel places the steel rod under tensile stress. The hooks are mounted in an annular beam. The steel rods and the hooks on the one hand and the steel vessel on the other hand form a closed system of forces with a stress distribution determined by cross section and elasticity.

Springs may also be provided in this closed system of forces consisting of the steel vessel and the steel rods in the reinforced-concrete tank. Such springs may be used to limit the pressure of the steel vessel generated by thermal expansion. Two supports for the steel vessel may also be arranged in vertical alignment. The two supports may be spaced apart at a distance which is greater than the corresponding length of the steel vessel in its cold condition, but is smaller than the corresponding distance of the steel vessel at its operating condition. In this manner, one can control the longitudinal expansion of the steel vessel in reference to the tensile forces applied.

DESCRIPTION OF THE DRAWINGS

FIG. 1 is a vertical section showing approximately one-half of an embodiment of the invention, the construction being symmetrical about the vertical axis;

FIG. 1a is the same as FIG. 1 but shows another embodiment; and

FIG. 2 is an enlarged view of a portion of FIG. 1 showing a portion of a self-locking hook and the steel ring.

DETAILED DESCRIPTION

Referring to FIG. 1a, many but not all of the parts for the embodiment of the reactor pressure tank shown are the same as the parts for the embodiment of the reactor pressure tank shown by FIG. 1. The reactor pressure tank of this invention for a nuclear reactor includes a pressure-resistant steel vessel 1 which is open at the top, a removable cover 2 for the top of the steel vessel 1 and a reinforced-concrete tank 3 which surrounds the steel vessel 1. The reinforced-concrete tank 3 is also open at the top. For safety, the reactor pressure tank is mounted in a spherical steel enclosure, not shown.

In both embodiments, the steel vessel 1 is provided around its circumference with eight coolant connections 5. Other embodiments may be designed with a larger or smaller number of such coolant connections. In the embodiment of FIG. 1, the steel vessel 1 is supported by stools 7 each on a support ring 8 which is anchored to the reinforced-concrete tank 3. In the embodiment of FIG. 1a, the steel vessel 1 is supported by steel brackets 9.

The removable cover 2 of the steel tank 1 is fastened to the steel tank 1 by screws 10 which are distributed uniformly around the circumference of the top of the steel tank 1. The steel ring 26 has recesses into which the screws 10 fit. The cover 2 also contains stubs 12 for control rods 13. The control rods 13 control the output of the reactor core (not shown) which is located in the steel vessel 1.

The concrete tank 3 is open at its upper end and its upper end terminates at the height of the cover 2. The concrete tank 3 consists of a reinforced-concrete portion 14 and an insulating concrete portion 15. The reinforced-concrete portion 14 can be stressed mechanically and is provided, for this purpose, with steel rods 30, shown by dashed lines in FIG. 1, which are movably arranged in pipes 31. The rods 30 and pipes 31 are axially disposed in the reinforced-concrete portion 14.

A cooling system 16 is arranged between the reinforced-concrete portion 14 and the insulating concrete portion 15. The cooling system 16 consists of pipe coils for cooling water. In both embodiments shown, the cooling system 16 extends to the lower region 17 of the reinforced-concrete tank 3 where the cooling system 16 is associated with the bottom of the steel vessel 1. In the embodiment of FIG. 1, the stool 7 and the support ring 8 for the steel vessel 1 provide a direct bridge for the heat which is absorbed from the steel vessel 1 by the cooling system 16.

In the embodiment of FIG. 1a, a sheet metal lining 18 is provided between the insulating concrete 15 and the vessel 1 in the region at the bottom of the steel vessel 1. Steel balls 20 are provided in the remaining space above sheet metal lining 18 between the insulating concrete 15 and the steel vessel 1. In place of steel balls 20, ceramic spheres or sphere-like natural products of suitable grain size may also be used.

In both embodiments shown, an annular steel beam 22 is anchored in the upper edge 21 of the reinforced-concrete tank 3. This annular beam 22 may be made of a plurality of beams which are connected together. This ring-shaped beam 22 provides support for the self-locking hooks 24 at pivot points 23. The steel hooks 24 engage the steel ring 26 which is disposed over and around the cover 2. This steel ring 26 holds the cover 2 down and braces the cover 2 against upward movement of the steel vessel 1 out of the reinforced-concrete tank 3, in the event of coolant pressure pushing the steel vessel upwards as the result of a leak in the pressure-resistant steel vessel 1.

The hooks 24 are self-locking over steel ring 26 because of a moment exerted on the hooks 24 about pivot point 23 toward cover 2. A force component is generated at the contact surface 27 between the hooks 24 and the steel ring 26 due to the incline of annular beam 22. When there is no load, the hooks 24 can be swung out of the way of the steel ring 26 easily and quickly by means of hydraulic drives 25 or by electrical means (not shown). The steel ring 26 can be removed completely after the hooks 24 have been swung away, so that the steel vessel is accessible. The concrete tank 3 would otherwise be necessary as a shield. But, in this invention, it also serves as a structural element which increases the safety of the nuclear reactor substantially.

One of the advantages of the new design of this invention is that it allows repeated tests to be performed at the steel tank 1. For example, it is possible to check the steel tank 1 in the vicinity of the coolant connections 5. It is also possible to expose the bottom of the steel vessel 1 in order to perform repeated tests at that point by means of a discharge canal 28 extending radially through the concrete tank in the embodiment shown in FIG. 1a. If such tests at the bottom of the steel vessel 1 are not required, the concrete portion can be designed to fit close to steel vessel 1, as shown in the embodiment of FIG. 1.

The contact area 27 between the hooks 24 and the steel ring 26 is shown in FIG. 1. The steel ring 26 has an inclined surface in the region of this contact area 27. Referring to FIG. 2, a clearance S is provided between the hook 24 and the steel ring 26 in the cold condition of the reactor, such as at an installation temperature of about 20° C. This clearance S is smaller than the elongation D which occurs in the steel vessel 1 and is transmitted to steel ring 26. The elongation D results from the elongation in the axial or longitudinal direction of the steel vessel 1 between the support stool 7 and the contact surface 27 in the embodiment of FIG. 1 or between the brackets 5 and the contact surface 27 in the embodiment shown by FIG. 1a. This elongation of the steel vessel 1 occurs as a result of thermal expansion when the steel vessel 1 is heated from its cold condition, which may be approximately 20° C., to the temperature of approximately 300° C. or more, which prevails during operation of the reactor.

After the reactor is started up, the steel vessel 1 expands with increasing temperature and thereby closes the gap indicated by the clearance S between the hook 24 and the steel ring 26, as shown in FIG. 2. Further temperature increase produces compressive forces in the steel vessel 1 and tensile forces in the axial steel rods 30, shown in the embodiment of FIG. 1. The magnitude of this tensile force and the compression force depends upon the initial clearance S and can be adjusted to desired values by means of inserts between hook 24 and steel ring 26. Thus, the thermal expansion and elongation of steel vessel 1 operates to produce a self-locking effect by means of the pivoted hooks 24 in reference to the cover 2 of the steel vessel 1.

This idea of the use of the elongation of steel vessel 1 to produce a self-locking effect can also be realized by a plurality of arrangements of the two support points displaced in the longitudinal direction for steel vessel 1. For example, the two support points for steel vessel 1 may comprise steel bracket 9 as shown by FIG. 1a at the upper part of steel vessel 1 and support stool 7 of FIG. 1 at the lower portion of steel vessel 1. For this arrangement, the bracket 9 and the support stool 7 are arranged in vertical alignment on the side of the steel vessel 1. The bracket 9 and the stool 7 are arranged so that the distance between bracket 9 and stool 7 is greater than the corresponding length of the steel vessel 1 in the cold condition and is smaller than the corresponding length of the steel vessel 1 at the operating temperature. As a result, the steel vessel 1 in its cold condition is initially supported by bracket 9. With increasing temperature and corresponding elongation of the steel vessel 1 in the longitudinal or axial direction, the steel vessel 1 makes contact with stool 7 and becomes supported by stool 7. Continuing elongation of steel vessel 1 causes the steel vessel 1 and steel ring 26 to "grow" by temperature elongation and expansion into hooks 24. The result is a self-locking action by means of hooks 24 on cover 2 of steel vessel 1. The coolant connections 5 are only slightly displaced, although the thermal expansion of steel vessel 1 occurs over the entire height of steel vessel 1.

During operation of the reactor the internal pressure is confined not only by the side wall of the pressure vessel but also by its ends, this resulting in the vessel's side wall being stressed in tension. As explained hereinbefore, the present invention, during operation of the reactor, applies to the pressure vessel a vertical compression. The vertical thermal expansion of the pressure vessel throughout its portion between the supporting means 7 and/or 9 and the ring 26 can, of course, be calculated as to its extent, and the space S shown in FIG. 2 may be proportioned so that when the reactor is in full operation with the hooks holding down the ring 26, the vertical compression applied to the portion of the reactor vessel between the supporting means 7 and/or 9 and the ring 26, equals or exceeds the tension stress resulting from the internal pressure, thus at least maintaining this portion of the wall of the steel vessel free from tension stress. As previously described, the clearance S can be adjusted to such desired values by means of inserts between the hooks 24 and the steel ring 26.

What is claimed is:

1. A nuclear reactor pressure-resistant vessel comprising a vertical metal tank having an open top provided with a removable metal cover, said metal tank being positioned in and surrounded by a vertical reinforced concrete tank having an open top and containing means below its top for supporting said metal tank therein against downward movement, and an intercept structure for restraining said metal tank and its cover from displacement upwardly through said concrete tank's open top; wherein the improvement comprises said structure being in the form of a metal ring removably positioned on said cover and resting on the cover's peripheral portion, the upper surface of said ring being adjacent to said concrete tank's open top and the latter having hooks pivotally connected thereto to swing radially with respect to said ring, said hooks having declining end surfaces which overlap said ring when the hooks are swung therewith, the periphery of said ring having a radially inwardly inclining surface positioned for engagement by said hooks' said end surfaces upon upward movement of said ring and providing a self-locking action holding the hooks against outward swinging during said engagement; said metal tank supporting means interconnecting said metal tank and said concrete tank at a position spaced below the tops of the metal tank and concrete tank a distance causing said end surfaces of said hooks and said declining surfaces of said ring to be pressed together to provide said self-locking action when at least the portion of said metal tank between the metal tank's top and said supporting means is thermally expanded vertically by reactor operating temperature, and so that the portion of said concrete tank between said hooks and said supporting means is tensioned by holding said hooks downwardly while applying vertical compression to said portion of said metal tank via the latter's said cover and said ring, and so that when said portion of said metal tank is contracted by a lower temperature, said declining surfaces of said ring and said overlapping ends of said hooks are interspaced to permit swinging of said hooks.

2. The vessel of claim 1 in which at least said portion of said concrete tank is provided with cooling means.

3. The vessel of claim 1 in which thermal insulation is interposed between said metal tank and at least said portion of said concrete tank.

4. The vessel of claim 1 in which at least said portion of said concrete tank includes metal bars reinforcing it against tensile stress when tensioned by holding said hooks downwardly.

5. The vessel of claim 1 in which said concrete tank has an annular metal beam anchored to its upper edge and to which said hooks are pivoted.

6. The vessel of claim 1 in which said interconnecting position is adjacent to the bottom of said metal tank.

7. The vessel of claim 6 in which said concrete tank contains a second means for supporting said metal tank therein against downward movement and interconnecting said metal tank and said concrete tank at a second position spaced below the tops of the metal tank and concrete tank, the two said positions being vertically interspaced a distance greater than the length of said metal tank between them when said tank is at said lower temperature and so that said metal tank is then supported by said second supporting means.

8. The vessel of claim 1 in which rolling bearing elements are interposed between said portion of said metal tank and said concrete tank.

9. The vessel of claim 1 in which said vertical compression applied to said metal tank is at least equal to the stress on the metal tank exerted by the internal pressure said vessel is designed to contain.

* * * * *

UNITED STATES PATENT AND TRADEMARK OFFICE
CERTIFICATE OF CORRECTION

PATENT NO. : 3 898 126
DATED : August 5, 1975
INVENTOR(S) : Heinrich Dorner et al It is certified that error appears in the above-identified patent and that said Letters Patent are hereby corrected as shown below:

In column 6, line 23 (claim 1) change "inwardly inclining surface" to --inwardly declining surface--

Signed and Sealed this twenty-fifth Day of November 1975.

[SEAL]

Attest:

RUTH C. MASON
*Attesting Officer*

C. MARSHALL DANN
*Commissioner of Patents and Trademarks*